United States Patent [19]

Buchanan et al.

[11] 4,297,889
[45] Nov. 3, 1981

[54] ROLL-UP TYPE U-TUBE MANOMETER

[75] Inventors: Steven O. Buchanan; James W. Phillips, both of Michigan City, Ind.

[73] Assignee: Dwyer Instruments, Inc., Michigan City, Ind.

[21] Appl. No.: 153,030

[22] Filed: May 27, 1980

[51] Int. Cl.³ .............................................. G01L 7/18
[52] U.S. Cl. ..................................................... 73/747
[58] Field of Search ................... 73/747, 748, 749, 750

[56] References Cited

U.S. PATENT DOCUMENTS 2,662,409 12/1953 Dwyer .................................. 73/747

Primary Examiner—Donald O. Woodiel
Attorney, Agent, or Firm—McWilliams, Mann & Zummer

[57] ABSTRACT

A roll-up type U-tube manometer of the type disclosed in Dwyer U.S. Pat. No. 2,662,409, in which the manometer tubes are defined by a flexible elongate body formed from a transparent flexible plastic material that is shaped to define the basic manometer tubes the opposing side walls of which are integrally connected in spaced apart relation by a web, in which the body along the front side of same is formed adjacent the juncture of the respective tubes and the web with a pair of continuous flanges at similar flat angles relative to the web to overlie same and define along each tube an apex shaped slot, which slots and the web form a slideway between the tubes in which a scale in the form of a length of spring steel stripping of film thickness dimensions, that is arced convexly of the front surface of same, is slidably mounted with continuous engagement by the body with the scale along the scale side edges to uniformly hold the scale in its slideway along its length, for smooth rolling up of the scale with the body when the manometer is rolled up for transport and/or storage and smooth unrolling of the body when the manometer is to be set up for use.

6 Claims, 5 Drawing Figures

U.S. Patent     Nov. 3, 1981     4,297,889
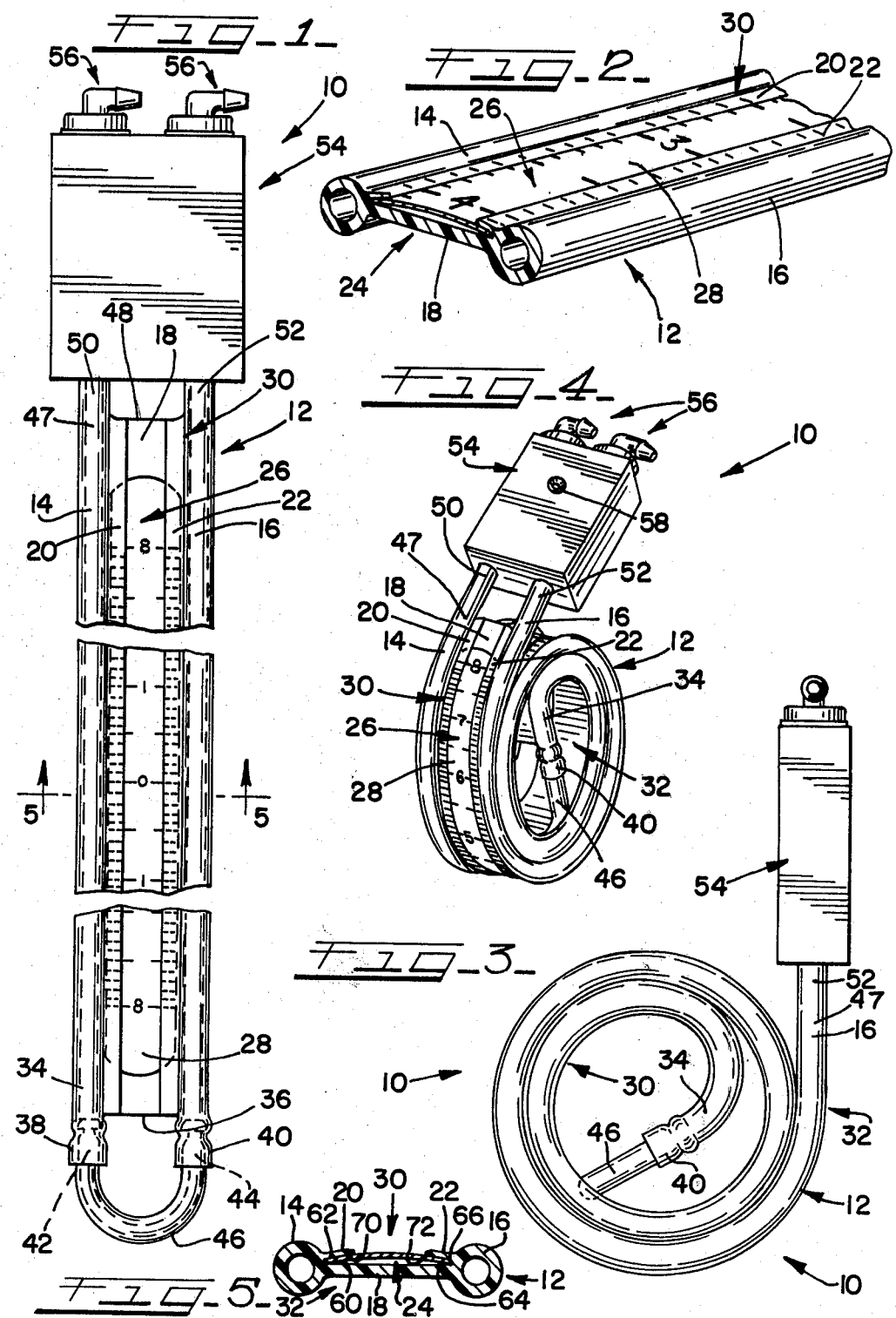

ROLL-UP TYPE U-TUBE MANOMETER

This invention relates to U-tube manometers, and more particularly to the roll-up type manometer that is in the nature of a laboratory U gauge arranged to be rolled up compactly for ease of carrying to test sites, and thus manometers of this type are intended for use primarily outside the laboratory.

James G. Dwyer U.S. Pat. No. 2,662,409, granted Dec. 15, 1953, discloses the original manometer of this type, in which the body of the manometer is formed from a suitable flexible transparent material, preferably by extruding a vinyl resin, to define a pair of elongate tubes connected together by a web that spaces the tubes apart and in parallelism longitudinally of the body. The tubes are connected together at their lower ends by a U-shaped cross tube formed from a suitable relatively rigid plastic material, such as a cellulose acetate butyrate, and at the upper end the tubes are arranged for connection to the locales where pressure is to be sensed. In the commercial form represented by Dwyer Instruments Inc. Slack-tube brand manometer, this manometer has the tube body upper end equipped with a molded nylon tubing connector assembly arranged for rapid shut off (see Dwyer Instruments Inc. Bulletin D-40, FIG. 5-3, at page 5, published in 1971).

The manometer body is equipped with a scale that in the arrangement of said Dwyer patent is formed from celluloid or the like, and is threaded through openings formed in the manometer body web, so as to lie between the manometer tubes. As the manometer is to provide for the indicated rolling up for ease of transport and storage, and unrolling for tests and other purposes, the scale must likewise be flexible to permit this, and in addition, this scale must be mounted on the manometer body so as to be adjustable vertically, when the instrument is set up, to permit the needed zero adjust in connecting the instrument for use.

In the commercial Slack-tube manometer as illustrated in the above referred to Dwyer bulletin, the scale is in the form a length of spring steel having its face provided with the usual manometer type indicia, and mounted on the manometer body web by using spaced U-clips, formed from a suitable relatively stiff transparent material such as a butyrate, with the individual clips being stapled to the web in spaced apart relation vertically of the manometer body, that are aligned longitudinally of the manometer body to slidably receive the scale along its side edges.

A special problem involved with gauges of this type is that when the gauge body is rolled up, it is necessary, of course, that the scale be rolled up with it; the scale is a separate element formed from a different material that, while flexible, must not be fixedly connected to the manometer body itself because of the zero adjust requirement. When the body and scale are rolled up and are unrolled, the scale tends to shift and bind relative to the manometer body, introducing localized stresses that unduly wear the manometer parts involved. Where the scale is of the indicated spring steel form, the shifting and chaffing action involved is very pronounced and in the form of a crinkling, buckling, snapping, and jumping of the scale relative to the manometer body, which has the result of causing the scale retaining clips to fracture as well as undue stresses and resulting wear on the manometer body where the individual clips are anchored.

A principal object of the present invention is to mount the spring steel scale on the manometer body in such a manner that the scale and body uniformly roll up together for transport and/or storage of the instrument, and uniformly unroll, when the instrument is to be set up for use, free of any binding or pulling stresses on the manometer body by way of separate motions induced in the scale due to the rolling up action involved and buckling and/or jumping of the scale relative thereto for the same reasons.

Another important object of the invention is to eliminate the need for separate holders, such as the aforementioned clips, to mount the scale on the manometer body, and have the securement arrangement for the scale an integral part of the manometer body and so shaped that economical extrusion techniques can continue to be used in making the body.

Another object of the invention is to provide a roll-up type manometer that is economical of manufacture, convenient to store, transport, and set up for use, and that in use has accuracy comparable to the finest laboratory U-gauges.

In accordance with the invention, the manometer tubes are defined by a flexible body of the type disclosed in said patent, and are formed from a transparent flexible plastic material, such as polyvinyl chloride, that is shaped to define, and preferably by way of extrusion, the basic manometer tubes that are integrally connected in spaced apart relation by the indicated web, which in the preferred embodiment is continuous between the upper and lower ends of the tubes. The flexible body has formed along the front side of same adjacent the juncture of the respective tubes and the web, a pair of continuous opposed flanges that run along either side of the web, and at a similar flat angle relative to same in overlying relation thereto, to define along each tube an apex shaped slot, which slots together with the web form a slideway in which the scale, in the form of the indicated spring steel strip having its face provided with manometer type indicia, is slidably mounted with continuous engagement of the manometer body with the scale along the scale side edges to uniformly hold the scale in its slideway along its length for smooth rolling up of the scale with the body when the manometer is to be transported and/or stored, and roll out when the manometer is to be set up for use.

The slideway defining flanges of the body are integral therewith and provide the sole securement of the scale to the body, while providing for manual movement of same longitudinally of the body to provide for the required zero adjust that is necessary for devices of this type.

Other objects, uses and advantages will be obvious or become apparent from a consideration of the following detailed description and the application drawings in which:

FIG. 1 is a fragmental front elevational view of a manometer arranged in accordance with the present invention; FIG. 2 is a fragmental perspective view of the manometer tube forming body and the scale mounted in same, in accordance with the practice of the invention;

FIG. 3 is a side elevational view showing the manometer rolled up for storage and/or transportation to a point of use and viewed as taken from the right hand side of FIG. 1;

FIG. 4 is a frontal perspective view of the manometer but shown rolled up in the opposite direction from that of FIG. 3; and FIG. 5 is a diagrammatic transverse cross-sectional view taken substantially along line 5—5 of FIG. 1, but on an enlarged scale.

However, it is to be distinctly understood that the specific drawing illustrations provided are supplied primarily to comply with the requirements of the Patent Laws, and that the invention is susceptible of modification and variations that will be obvious to those skilled in the art, and which are intended to be covered by the appended claims.

Reference numeral 10 of FIGS. 1, 3 and 4 generally indicates a preferred embodiment of the invention representing the best mode of practicing the invention, which comprises the manometer body 12 that includes spaced apart tubes 14 and 16 extending longitudinally of the body 12 and spaced apart and integrally united by web 18 that also extends longitudinally of the body 12.

In accordance with the present invention, the body 12 also includes spaced apart flanges 20 and 22 that together with the web 18 form a slideway 24 (see FIGS. 2 and 5) that slidably receives flexible scale 26 which bears on its front side 28 scale indicia suitable for manometer gauges.

The slideway 24 is formed on the front side 30 of the manometer, with the manometer 10 in use normally being suitably secured in an upright position with the front side 30 facing the user and the back side 32 facing the panel, or other suitable support member on which the manometer 10 is mounted for use.

The body 12 is preferably formed from a suitable transparent plastic material, such as a clear polyvinyl chloride and is shaped to the configuration indicated in FIGS. 2 and 5 by using a suitable extruding apparatus that forms the resulting extrusion in long lengths that can be later cut to appropriate size in terms of length and the like for the individual bodies 12. At the lower end 34 of the body the web 18 may be trimmed away as desired to define the lower web edge 36, leaving the lower tube ends 38 and 40 projecting free of the web 18 to receive the ends 42 and 44 of cross tube 46. Cross tube 46 may be formed from a relatively rigid transparent plastic material (in accordance with said patent), such as a cellulose acetate butyrate, though, of course, it could be glass. The ends 42 and 44 of cross tube 46 are proportioned to be press fitted into the manometer tube lower ends 38 and 40 so that an effective sealing is provided at this location of the manometer, in accordance with standard practices. Cross tube 46 may also be formed from the same material as body 12, with its ends 42 and 44 being suitably bonded to and in leak free relation to tube ends 38 and 40, respectively, as by employing a suitable glue.

The upper end 47 of the body 12 in the form shown has the web 18 trimmed back to define the upper web margin 48, to leave the upper ends 50 and 52 of the manometer body tubes 14 and 16 projecting from the body 12 for connection to the locales where pressures are to be sensed in using the device 10 in accordance with standard practices. In the illustrated embodiment, the upper ends 50 and 52 of the manometer body tubes 14 and 16 are suitably connected to the diagrammatically illustrated Dwyer nylon tubing connector assembly 54 that is per se old in the art, and which is illustrated in the afore-identified bulletin. This connector assembly is characterized by having its tube connectors 56 mounted and arranged so that when rotated counterclockwise to the open position the manometer tube 14 or 16 served by a connector 56 is open, and when rotated clockwise to the closed position, the tube 14 or 16 served by a connector 56 is closed. The assembly 54 is formed with a suitable through aperture 58 for supporting the device 10 from a nail or the like at the point of use. It is also common practice to provide assembly 54 with magnetic clips (not shown) that optionally hold the instrument in working position to any upright steel surface.

Returning now more specifically to the body 12, and in particular, its slideway 24 and the scale member 26 operably mounted therein, it will be observed that the flange 20 along one side of the body web 18 is integral with the tube 14 along the length of the web 18 and overlies the web 18 in flat angled relation thereto to define an apex shaped slot 60 in which one side edge 62 of the scale member 26 is lodged.

Similarly, the flange 22 is integral with the body tube 16 and overlies the front side of the web 18 in flat angled relation thereto to define an apex shaped slot 64 in which the other side edge 66 of the scale member 26 is received. An angulation of the flanges 20 and 22 relative to web 18 of approximately 15 degrees is employed in the illustrated embodiment.

The slots 60 and 64 extend the length of the web 18 in the illustrated embodiment and slidably mount the scale member 26 for manual adjustment movement longitudinally of the body 12 so that the zero adjust provision required for instruments of this type is provided for.

The scale member 26 is formed from spring steel of film dimensions in thickness and physically is comparable to the conventional spring steel measuring tape. Scale member 26 is arced as indicated in FIG. 5 so that its forwardly facing surface 28 is convexly curved transversely of the body 12, with the member 26 being proportioned in dimension between its side edges 62 and 66 so that it will easily fit between the tubes 14 and 16 in close fitting relation thereto, with the arced configuration of the scale member disposing the front surface 28 of the scale member along its longitudinally extending side portions in engagement with the undersides 70 and 72 of the respective body flanges 20 and 22.

In assemblying the device 10, assuming a body 12 is trimmed to the shaping indicated in FIG. 1, the cross tube 46 may be applied to the lower ends of the body 12, and the upper end of the body 12 is applied to a connector assembly 54, as desired, or otherwise be arranged for appropriate connection to locales where pressures are to be sensed, such as is suggested by said patent. The scale member 26 may be applied to the body 12 as by slipping same into the body slideway 24 from end 34 of the body, To ready a device 10 for use, an appropriate amount of a suitable liquid (such as water or mercury) is applied to the connected tubes 14 and 16 following conventional practices (not shown).

In use, the device 10 may be supported from a nail or the like applied to the aperture 58 and have the connectors 56 suitably connected to the locales where pressures are to be sensed. If one pressure is to be related to atmospheric pressure, one of the connectors 56 is left unconnected. However, if differential pressures are to be read on the manometer, the two connectors 56 are suitably connected to the locales of the different pressures to be compared. The connectors 56 are moved to their open positions to run the test and are moved to the closed position when the test is completed.

When the device 10 is to be stored or arranged for transportation, assuming the connectors 56 are in their closed positions, and scale member 26 is centered vertically of body 12, body 12 is rolled up in one of the manners indicated in FIGS. 3 and 4, with the lower end of the body 12 and its cross tube 46 being rolled up the front side of the body 12 to the positioning indicated, as suggested in FIG. 3, or up the back side of the body 12 as suggested in FIG. 4. The rolled up configuration of FIG. 3, with the scale on the inside, is preferred.

Heretofore in prior manometers of this type, the rolling up of the body 12 with the scale member 26 applied thereto induces on the scale member crinkling, lateral indentations producing some projection of portions of the scale member 26 forwardly of the forward side of web 18, and some jumping and snapping of the scale member, and particularly in those positions of the scale member 26 that lie between the portions of the member that are held to the web 18, which has caused undue stress concentrations on the separate connectors that formerly secured the scale member 26 to the body 12, as well as to the connections to the web 18 of such connectors. A similar type action, usually more pronounced where the body 12 is rolled up its back side, because of the change of position of the bent portions of the scale member 26 relative to the body member of web 18 that were occasioned by the rolling up procedure, occur when the body is rolled out.

In the arrangement illustrated, the flanges 20 and 22 hold the scale member 26 fully aligned with the body member tubes and web 18 along the length of member 26 as the body 12 is rolled up so that no indentations, projections, or jumping of the scale member relative to the body 12, occur, with the result that the scale member and body 12 uniformly and smoothly are rolled up to their carrying and storing position of FIGS. 3 and 4 and similarly unrolled to the substantially rectilinear planar use position indicated in FIG. 1. While the scale member 26 is frictionally retained against displacement longitudinally of the body member 12 by the frictional engagement of the body 12 with the scale member 26 at the slots 60 and 64, the user of the instruments may readily shift the scale member 26 longitudinally of the slotway 24 by finger pressing either end of the scale member 26 downwardly or upwardly as needed to appropriately set the scale member relative to the body 12 for zero adjustment.

It will therefore be seen that the invention provides a roll-up type manometer in which the flexible body that defines the manometer tubes is of one piece construction arranged to also provide for slidable mounting of the manometer scale in a manner that keeps the scale fully aligned with the body member for stress free rolling up and unrolling of the manometer. In addition, the need for separate components to secure the scale member to the manometer body is eliminated, as is the problem of anchoring the securing devices to the web of the body. The body as extruded will slidably though frictionally receive the scale member from either end of same by way of transparent hold down flanges that extend the length of the body to keep the scale member aligned with its tubes free of indentations and snap action that is characteristic of spring steel measuring tapes. The transparent nature of flanges 20 and 22 insures reading of the scale.

The flanges 20 and 22 and the scale slideway they define eliminate the need for the prior art separate connectors and the need for the web openings called for by said patent, while retaining their function and at the same time eliminating the wear problem caused by rolling up and unrolling of the body 12.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. In a roll-up flexible manometer comprising an elongate body formed from a transparent flexible plastic material to define a pair of spaced apart parallel tubes separated by an integral web that extends substantially the length of the tubes and defines a forwardly facing side and a rearwardly facing side, means for connecting the lower ends of said tubes, an elongate flexible scale positioned along the forward side of the web between and paralleling the tubes, and means for slidably mounting the scale for movement longitudinally of said body for effecting zero adjustment of the scale, the improvement wherein said means for slidably mounting the scale comprises:
a pair of substantially opposed flanges integral with said body and extending longitudinally of same in overlaying closely spaced relation to the forwardly facing side of the web,
one of said flanges being integral with one of the tubes and the other of said flanges being integral with the other tube,
said flanges defining projecting edges that parallel said body and are spaced apart transversely of the body to expose the scale,
said scale having its respective side edges slidably received under the respective flanges,
said flanges and the portion of the web underlying same embracing the respective side edges of said scale substantially continuously therealong,
whereby when the body is rolled up, for storage, the scale uniformly rolls up with same free of crinkling and indentations.

2. The improvement set forth in claim 1 wherein:
said scale is a length of spring steel of film thickness dimensions that is arced forwardly of the body web along the length of said scale.

3. The improvement set forth in claim 2 wherein:
said flanges along their respective lengths are inclined at substantially equal flat angles relative to said web whereby they project toward each other in a converging directional configuration.

4. A flexible U-tube manometer of the roll-up type comprising:
an elongate flexible body formed from a transparent flexible plastic material and defining a pair of spaced apart tubes extending longitudinally of said body and joined together by a web integrally connecting same that extends substantially the length of said tubes,
said web defining a forward facing side surface on the front side of said body and a rearwardly facing side surface on the back side of said body,
said body along its front side and adjacent the juncture of the respective tubes and said web defining a pair of continuous flanges,
one of said flanges being disposed along one of said tubes and the other of said flanges extending along the other of said tubes, said flanges being in overlying, closely spaced relation relative to said web and each defining a continuous projecting edge portion that parallels said body, with said flange projecting edge portions being spaced apart transversely of said body, said flanges and said web defining therebetween a scale slideway, an elongate flexible scale member mounted in said slideway for sliding movement therealong, said scale member comprising a length of spring steel of film thickness dimensions that is arced forwardly of said body web along the length of said scale member, said scale member bearing manometer scale indicia on its forward facing side and defining side edge portions therealong on either side of same that extend longitudinally of said body and that are respectively slidably engaged by the respective flanges, whereby said scale member is frictionally retained in selected zero adjust positions within said scale slideway, means for connecting said body tubes at the lower end of said body, and means for connecting said tubes at the upper end of said body to locales of fluid pressure to be measured manometer style, whereby when the body containing said scale member in said slideway is rolled up, for storage, said scale member uniformly rolls up with said body free of crinkling and indentations.

5. The manometer set forth in claim 4 wherein:

said flanges along their respective lengths are inclined at substantially equal flat angles relative to said web in diverging relation in the direction of their respective projecting edges relative to said web, whereby they project toward each other in a converging directional configuration.

6. The manometer set forth in claim 5 wherein:

said flanges at their juncture with the respective tubes and said web define apex shaped ways in which said scale member side portions are frictionally lodged along their respective lengths.

* * * * *